(12) United States Patent
Shen et al.

(10) Patent No.: US 8,767,900 B2
(45) Date of Patent: Jul. 1, 2014

(54) SIGNAL TRANSITION DETECTION CIRCUIT AND METHOD OF THE SAME

(75) Inventors: Yu-Chen Shen, Taipei (TW); Kuei-Chang Yang, Taipei (TW)

(73) Assignee: Test Research, Inc., Taipei (TW)

( * ) Notice: Subject to any disclaimer, the term of this patent is extended or adjusted under 35 U.S.C. 154(b) by 0 days.

(21) Appl. No.: 13/454,352

(22) Filed: Apr. 24, 2012

(65) Prior Publication Data
US 2013/0223493 A1    Aug. 29, 2013

(51) Int. Cl.
*H04L 7/02*    (2006.01)

(52) U.S. Cl.
USPC .......................................... 375/360; 375/359

(58) Field of Classification Search
USPC .......................................... 375/360, 359, 354
See application file for complete search history.

(56) References Cited

U.S. PATENT DOCUMENTS

| | | | |
|---|---|---|---|
| 5,894,280 A * | 4/1999 | Ginetti et al. | ................. 341/118 |
| 8,094,766 B2 | 1/2012 | Conner | |
| 2005/0025195 A1 * | 2/2005 | Barrett et al. | ................. 370/532 |
| 2005/0134307 A1 | 6/2005 | Stojanovic et al. | |
| 2006/0064259 A1 | 3/2006 | Zeng et al. | |
| 2010/0201300 A1 * | 8/2010 | Lyden et al. | ................. 318/561 |

FOREIGN PATENT DOCUMENTS

WO    WO 2011/010314    1/2011

* cited by examiner

*Primary Examiner* — Chieh M Fan
*Assistant Examiner* — Brian J Stevens
(74) *Attorney, Agent, or Firm* — Merchant & Gould P.C.

(57) ABSTRACT

A signal transition detection circuit is provided. The signal transition detection circuit comprises a counter module, a DAC, a comparator and a digital sampling module. The counter module generates a digital step signal. The DAC converts the digital step signal into an analog input signal and transmits it to an under-test circuit such that the under-test circuit generates an output signal transiting from a first stable level to a second stable level, wherein a transition section is located between the first and the second stable level. The comparator receives and compares the output signal with a default value to generate a normalized output signal. The digital sampling module samples the normalized output signal to retrieve impulses such that when the number of the impulses is accumulated to be larger than a reference value, a corresponding step of the digital step signal is determined to be a transition point.

11 Claims, 5 Drawing Sheets

SIGNAL TRANSITION DETECTION CIRCUIT AND METHOD OF THE SAME

RELATED APPLICATIONS

This application claims priority to Taiwan Application Serial Number 101106046, filed Feb. 23, 2012, which is herein incorporated by reference.

BACKGROUND

1. Technical Field

The present disclosure relates to a circuit testing method. More particularly, the present disclosure relates to a signal transition detection circuit and method of the same.

2. Description of Related Art

Testing is in important stage during the manufacturing process of an electric circuit or a chip. A well-designed test process can perform verification on different parameters of the electric circuit and the chip such that the reliability of the electric circuit and the chip can be guaranteed. Transition point is an important test item of the electric circuit. However, the transition of the output voltage of the under-test circuit becomes unstable when the speed of the test procedure becomes faster such that it is hard to determine the exact position of the transition point. Further, the delay of the signal generated in the test circuit may cause inaccurate test result.

Accordingly, what is needed is a signal transition detection circuit and method of the same to overcome the above issues. The present disclosure addresses such a need.

SUMMARY

An aspect of the present disclosure is to provide a signal transition detection circuit. The signal transition detection circuit comprises a counter module, a digital to analog converter (DAC), a comparator and a digital sampling module. The counter module generates a digital step signal. The DAC converts the digital step signal into an analog input signal and transmits the analog input signal to an under-test circuit such that the under-test circuit generates an output signal transiting from a first stable level to a second stable level, wherein a transition section is located between the first stable level and the second stable level. The comparator receives the output signal and compares the output signal with a default value to generate a normalized output signal. The digital sampling module samples the normalized output signal to retrieve a plurality of impulses from the transition section and the second stable level such that when the number of the plurality of impulses is accumulated to be larger than a reference value, a corresponding step of the digital step signal is determined to be a transition point.

Another aspect of the present disclosure is to provide a signal transition detection method used in a signal transition detection circuit. The signal transition detection method comprises the steps outlined below. A digital step signal is generated. The digital step signal is converted into an analog input signal and the analog input signal is transmitted to an under-test circuit such that the under-test circuit generates an output signal transiting from a first stable level to a second stable level, wherein a transition section is located between the first stable level and the second stable level. The output signal is compared with a default value to generate a normalized output signal. The normalized output signal is sampled to retrieve a plurality of impulses from the transition section and the second stable level. A corresponding step of the digital step signal is determined to be a transition point when the number of the plurality of impulses is accumulated to be larger than a reference value.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
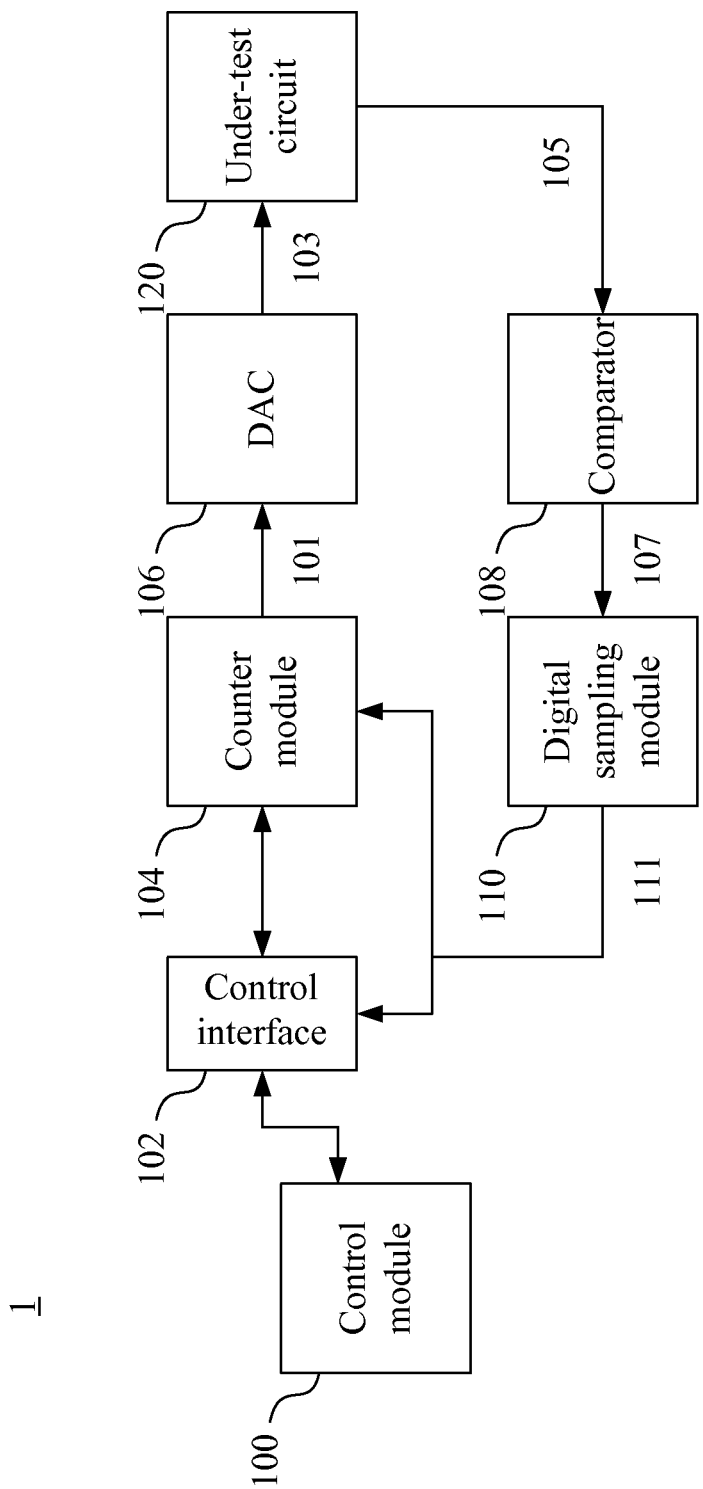
FIG. 1A is a block diagram of a signal transition detection circuit in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1A is a block diagram of a signal transition detection circuit 1 in an embodiment of the present disclosure. The signal transition detection circuit 1 comprises a control module 100, a control interface 102, a counter module 104, a digital to analog converter (DAC) 106, a comparator 108 and a digital sampling module 110.

The control module 100 controls the counter module 104 through the control interface 102 such that the counter module 104 is able to generate a digital step signal 101. In an embodiment, the control module 100 is implemented by a central processing unit of a host to set up the counter module 104 through the control interface 102.

Figure 2:
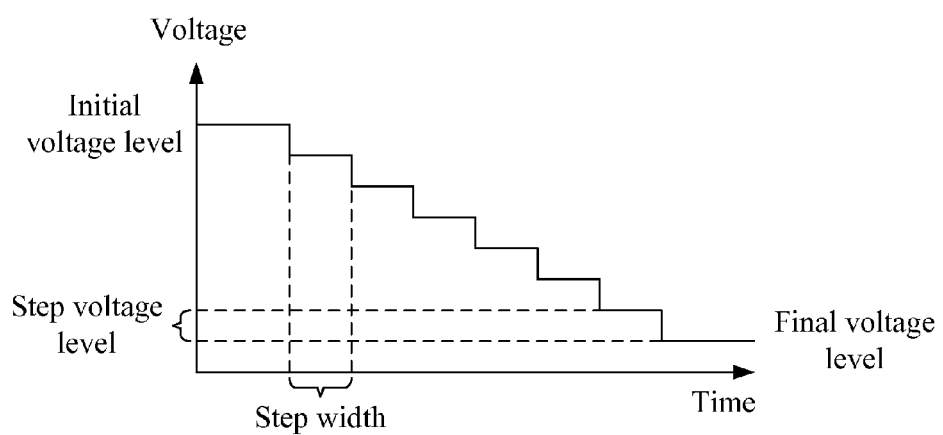
FIG. 2 is a graph of the waveform of a digital step signal in an embodiment of the present disclosure.

FIG. 2 is a graph of the waveform of the digital step signal 101 in an embodiment of the present disclosure. The control module 100 sets up an initial voltage level, a step voltage level, a step width and a final voltage level of the digital step signal 101. The initial voltage level and the final voltage level determine the range of the digital step signal such that the digital step signal gradually increases or decreases within the two voltage levels. The step voltage level and the step width determine the slope of the digital step signal 101. In the embodiment shown in FIG. 2, the digital step signal 101 gradually decreases.

Figure 3A:
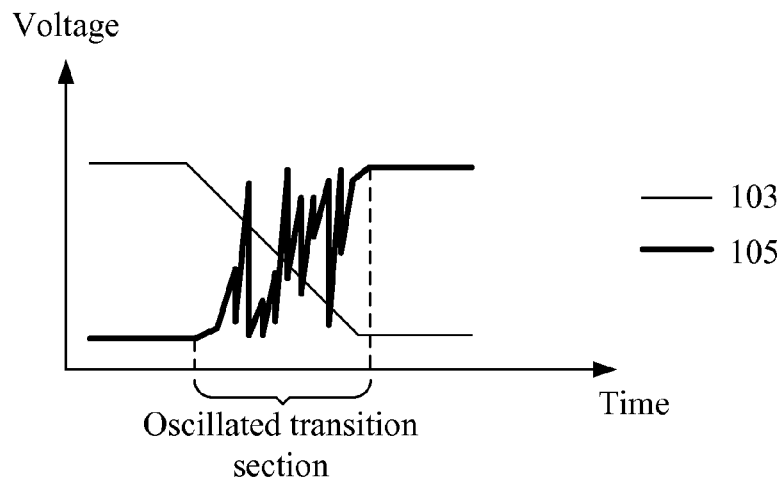
FIG. 3A is a graph of waveforms of an analog input signal and an output signal in an embodiment of the present disclosure.

In FIG. 1A, the DAC 106 further converts the digital step signal 101 into an analog input signal 103 and transmits the analog input signal 103 to an under-test circuit 120 such that the under-test circuit 120 generates an output signal 105. In an embodiment, the DAC 106 comprises a filter to perform filtering on the signal such that the noise can be filtered out. In the present embodiment, the under-test circuit 120 is an inverter. Referring to FIG. 3A at the same time, in which FIG. 3A is a graph of waveforms of the analog input signal 103 (thin line) and the output signal 105 (thick line) in an embodiment of the present disclosure. The analog input signal 103 gradually decreases from a high level to a low level since it is generated according to the digital step signal 101 depicted in FIG. 2. The output signal 105 generated by the under-test circuit 120 gradually increases from a first stable level (low level) to a second steady level (high level) since the under-test circuit 120 is the inverter in the present embodiment. When the circuit is operated under a high-speed condition, a transition section that has oscillation is presented when the output signal 105 transits from the first stable level to the second steady level.

Figure 3B:
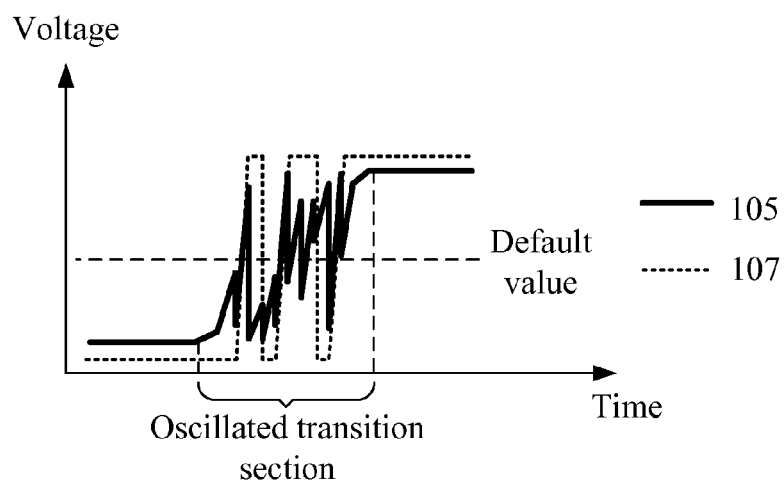
FIG. 3B is a graph of waveforms of the output signal and a normalized output signal in an embodiment of the present disclosure.

The comparator 108 depicted in FIG. 1A further receives the output signal 105 and compares the output signal 105 with a default value to generate a normalized output signal 107. FIG. 3B is a graph of waveforms of the output signal 105 (thick line) and the normalized output signal 107 (dotted line) in an embodiment of the present disclosure. After the normalization, the different voltage levels in the oscillated transition section of the output signal 105 are normalized into either a high level or a low level shown in the oscillated transition section of the normalized output signal 107.

Figure 3C:
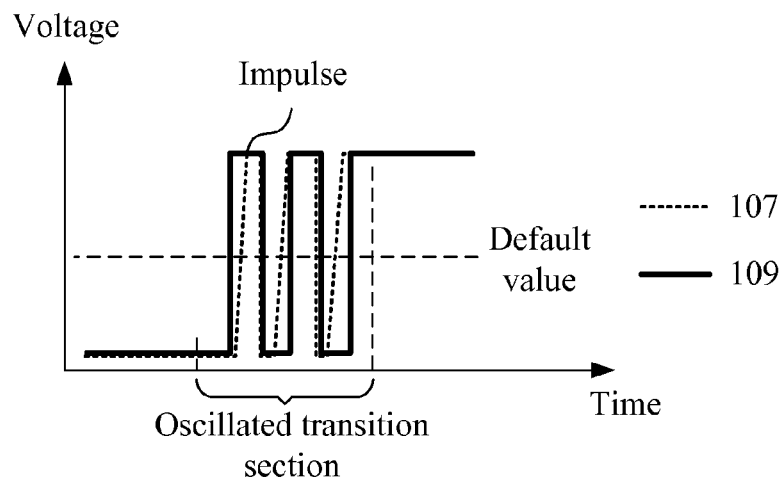
FIG. 3C is a graph of waveforms of a normalized output signal and a sampled signal in an embodiment of the present disclosure.

The digital sampling module 110 depicted in FIG. 1A samples the normalized output signal 107 to retrieve a plurality of impulses from the transition section and the second stable level. FIG. 3C is a graph of waveforms of the normalized output signal 107 (dotted line) and a sampled signal 109 (thick line) in an embodiment of the present disclosure. In an embodiment, the sampling frequency is 40 MHz. In other embodiment, the sampling frequency can be adjusted to other values as well. Consequently, impulses are generated by sampling the normalized output signal 107. It is noted that the horizontal part of the signal in the sampled signal 109 corresponding to the part of the normalized output signal 107 transits from the transition section and the second stable level substantially includes a plurality impulses connected to each other continuously.

Figure 1B:
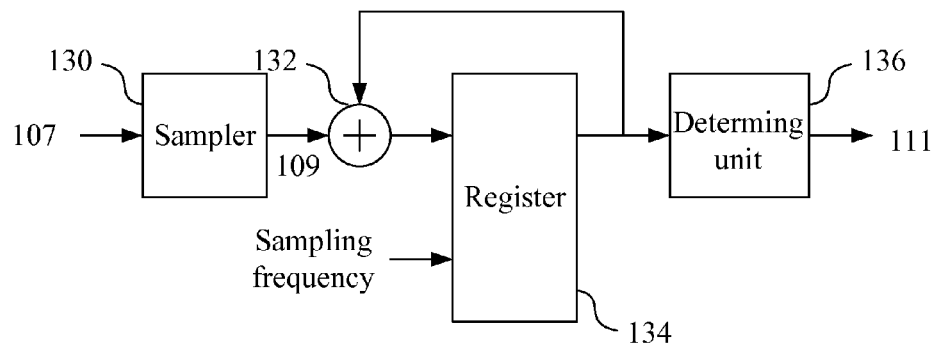
FIG. 1B is a detailed block diagram of a digital sampling module in an embodiment of the present disclosure.

FIG. 1B is a detailed block diagram of the digital sampling module 110 in an embodiment of the present disclosure. The digital sampling module 110 comprises a sampler 130, an integrator having an adder 132 and a register 134 and a determining unit 136. The sampler 130 samples the normalized output signal 107 and generates the sampled signal 109 depicted in FIG. 3C. In the present embodiment, the integrator includes the adder 132 and the register 134 to accumulate the number of the impulses. It is noted that the integrator can be implemented by other kinds of circuits or elements in other embodiments. After the integrator counts the number of the impulses, the determining unit 136 determines whether the number of the plurality of impulses is accumulated to be larger than a reference value.

For example, the reference value can be set to two such that the determining unit 136 of the digital sampling module 110 generates an intimating signal 111 to the counter module 104 and the control interface 102 when the number of the impulses is larger than two. In other embodiments, the reference value can be set to other suitable values according to the need or the experience. In the present embodiment, the counter module 104 stops to generate the digital step signal 101 upon the receipt of the intimating signal 111. The control module 100 can retrieve the information of the last outputted step of the digital step signal 101 through the control interface 102 and further determine the last outputted step is the transition point of the output signal 105 generated from the under-test circuit 120. The section of the sampled signal is closer to the second stable level when the number of the impulses is larger. Accordingly, in other embodiments, the reference value can be set to a larger value if the higher reliability is the concern such that the number of the impulses is accumulated to be larger than the reference value when the sampled signal 109 becomes stable.

Consequently, the signal transition detection circuit 1 in the present disclosure can detect the transition point of the output signal 105 of the under-test circuit 120 rapidly and accurately without being affected by the unstable oscillation of the transition section of the output signal 105 generated due to the high-speed transition.

Figure 4:
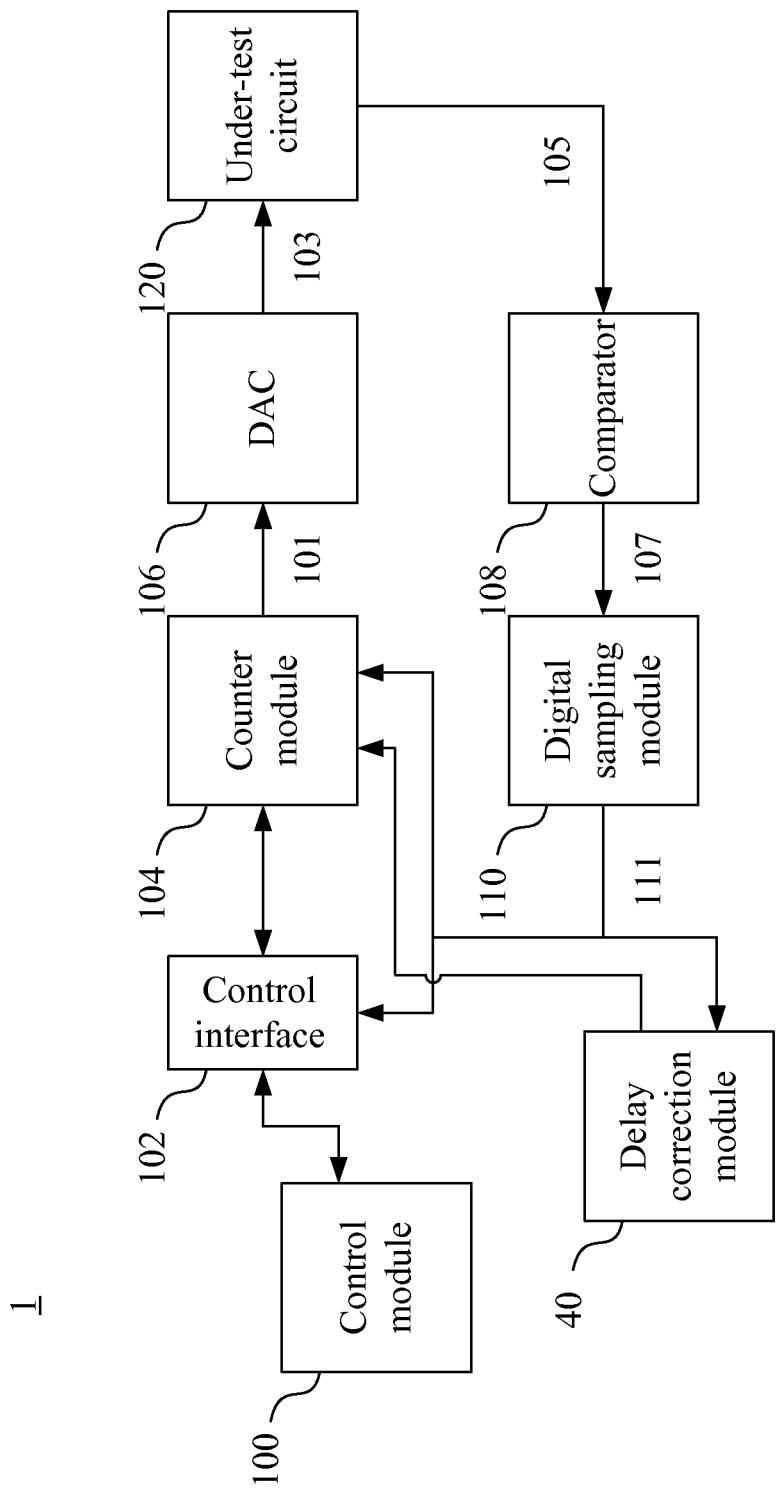
FIG. 4 is a block diagram of the signal transition detection circuit in another embodiment of the present disclosure.

FIG. 4 is a block diagram of the signal transition detection circuit 1 in another embodiment of the present disclosure. Similar to the signal transition detection circuit 1 shown in FIG. 1A, the signal transition detection circuit 1 depicted in FIG. 4A comprises the control module 100, the control interface 102, the counter module 104, the DAC 106, the comparator 108 and the digital sampling module 110. Nevertheless, the signal transition detection circuit 1 depicted in FIG. 4A further comprises a delay correction module 40.

The signal processing operations of the DAC 106, the comparator 108 and the digital sampling module 110 cause a delay effect. Hence, the intimating signal 111 generated by the digital sampling module 110 is not able to correspond to the actual step of the digital step signal due to the delay effect. The delay correction module 40 can calculate a delay time according to the DAC 106, the comparator 108 and the digital sampling module 110 such that when the counter module 104 stops to generate the digital step signal 101 according to the intimating signal 111, a step corresponding to a time that is a last generating time of the digital step signal 101 minus the delay time is determined to be the step that corresponding to he transition point.

In an embodiment, the delay correction module 40 further takes the time it needs to accumulate the impulses to be larger than the reference value into consideration. When a larger reference value is used such that the time to accumulate the number of impulses is longer, the delay correction module 40 can provide the related information such that the system can make the correction.

Consequently, the signal transition detection circuit 1 in the present disclosure can detect the transition point of the output signal 105 of the under-test circuit 120 rapidly and accurately without being affected by the unstable oscillation of the transition section of the output signal 105 generated due to the high-speed transition and the delay of the circuit.

Figure 5:
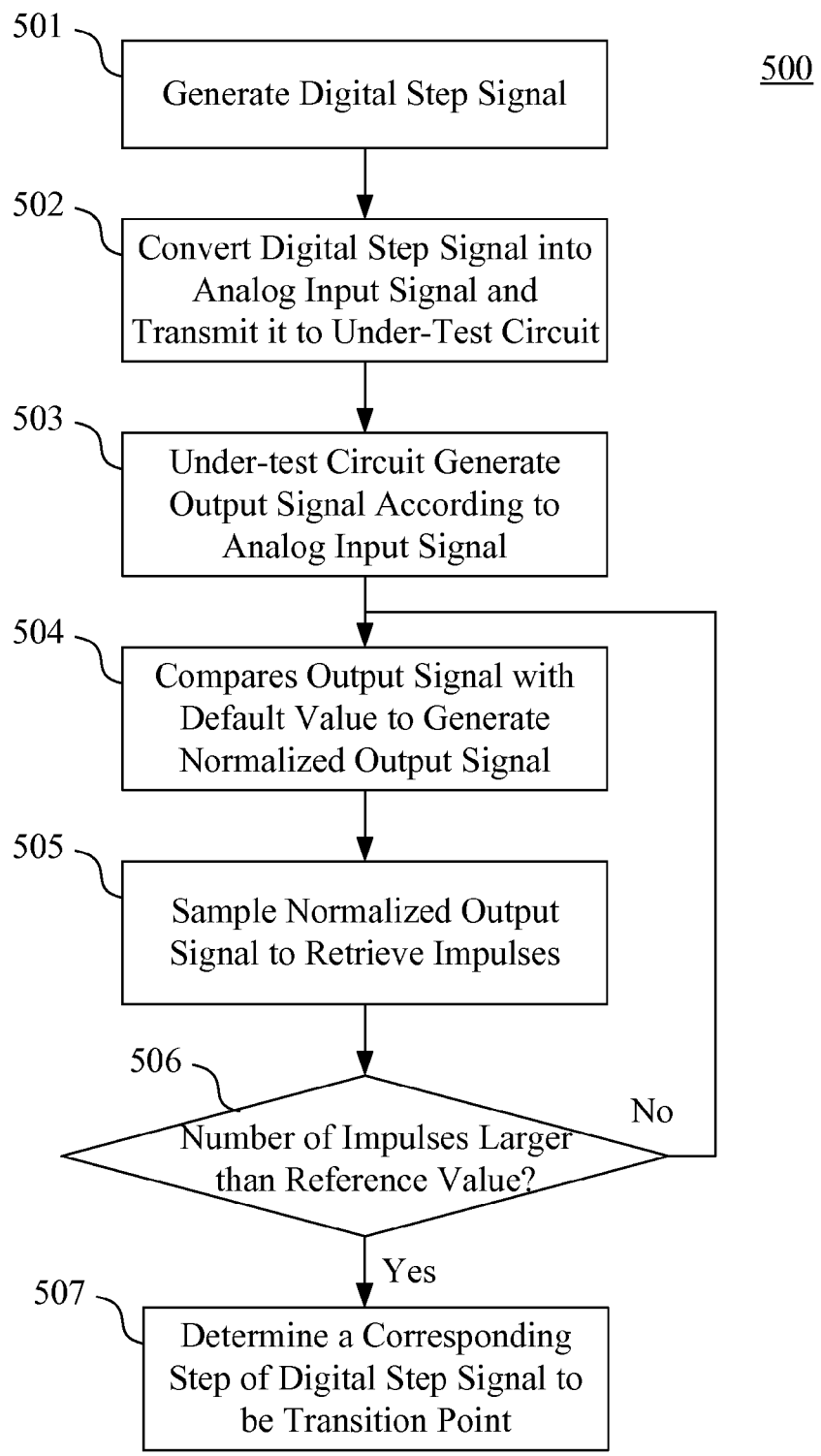
FIG. 5 is a flow chart of a signal transition detection method in an embodiment of the present disclosure.

FIG. 5 is a flow chart of a signal transition detection method 500 in an embodiment of the present disclosure. The signal transition detection method 500 can be used in the signal transition detection circuit 1 depicted in FIG. 1 or FIG. 4. The signal transition detection method 500 comprises the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 501, the counter module 104 generates the digital step signal 101. In step 502, the DAC 106 converts the digital step signal 101 into the analog input signal 103 and transmits the analog input signal 103 to the under-test circuit 120. In step 503, the under-test circuit 120 generates the output signal 105 transiting from the first stable level to the second stable level, wherein the transition section is located between the first stable level and the second stable level.

In step 504, the comparator 108 compares the output signal 105 with the default value to generate the normalized output signal 107. In step 505, the sampling module 110 samples the normalized output signal 107 to retrieve a plurality of impulses from the transition section and the second stable level. In step 506, whether the number of the plurality of impulses is accumulated to be larger than the reference value is determined. When the number of the impulses is not larger than the reference value, the flow goes back to step 505 to keep sampling the normalized output signal 107. When the number of the impulses is larger than the reference value, a corresponding step of the digital step signal is determined to be the transition point in step 507.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A signal transition detection circuit comprising:
    a counter module to generate a digital step signal;
    a digital to analog converter (DAC) to convert the digital step signal into an analog input signal and to transmit the analog input signal to an under-test circuit such that the under-test circuit generates an output signal transiting from a first stable level to a second stable level, wherein a transition section is located between the first stable level and the second stable level;
    a comparator to receive the output signal and to compare the output signal with a default value to generate a normalized output signal;
    a digital sampling module to sample the normalized output signal to retrieve a plurality of impulses from the transition section and the second stable level such that when the number of the plurality of impulses is accumulated to be larger than a reference value, the counter module stops to generate the digital step signal; and
    a delay correction module to calculate a delay time according to the DAC, the comparator and the digital sampling module such that when the counter module stops to generate the digital step signal, a step of the digital step signal corresponding to a time that is a last generating time of the digital step signal minus the delay time is determined to be a corresponding step that is determined to be a transition point.

2. The signal transition detection circuit of claim 1, wherein the delay time further comprises an accumulation time of the plurality of the impulses.

3. The signal transition detection circuit of claim 1, wherein the digital sampling module further comprises:
    a sampler to sample the normalized output signal and to generate a sampled signal comprising the plurality of impulses;
    an integrator to count the number of the plurality of impulses; and
    a determining unit to determine whether the number of the plurality of impulses is accumulated to be larger than the reference value and to generate an intimating signal to the counter module when the number of the plurality of impulses is larger than the reference value.

4. The signal transition detection circuit of claim 1, wherein the DAC further comprises a filter.

5. The signal transition detection circuit of claim 1, wherein the under-test circuit is an inverter.

6. The signal transition detection circuit of claim 1, further comprising a control module to control an operation of the counter module.

7. The signal transition detection circuit of claim 6, wherein the control module sets up an initial voltage level, a step voltage level, a step width and a final voltage level of the digital step signal.

8. A signal transition detection method used in a signal transition detection circuit, wherein the signal transition detection method comprises:
    generating a digital step signal;
    converting the digital step signal into an analog input signal and transmitting the analog input signal to an under-test circuit such that the under-test circuit generates an output signal transiting from a first stable level to a second stable level, wherein a transition section is located between the first stable level and the second stable level;
    comparing the output signal with a default value to generate a normalized output signal; and
    sampling the normalized output signal to retrieve a plurality of impulses from the transition section and the second stable level;
    stopping to generate the digital step signal when the number of the plurality of impulses is accumulated to be larger than a reference value; and
    calculating a delay time according to the signal transition detection circuit such that when stopping to generate the digital step signal, a step of the digital step signal corresponding to a time that is a last generating time of the digital step signal minus the delay time is determined to be a corresponding step that is determined to be a transition point.

9. The signal transition detection method of claim 8, wherein the delay time further comprises an accumulation time of the plurality of the impulses.

10. The signal transition detection method of claim 8, further comprising the steps of:
    sampling the normalized output signal and to generate a sampled signal comprising the plurality of impulses;
    counting the number of the plurality of impulses; and
    determining whether the number of the plurality of impulses is accumulated to be larger than the reference value and to generate an intimating signal to the counter module when the number of the plurality of impulses is larger than the reference value.

11. The signal transition detection method of claim 8, wherein the step of generating the digital step signal further comprises setting up an initial voltage level, a step voltage level, a step width and a final voltage level of the digital step signal.

* * * * *